March 15, 1960  C. I. CLAUSING ET AL  2,928,514
OVERRUNNING SPRING CLUTCH
Filed April 29, 1957

INVENTORS
CHALLISS I. CLAUSING
ANTHONY P. ROMANO
BY
ATTORNEYS

United States Patent Office 2,928,514
Patented Mar. 15, 1960

2,928,514

OVERRUNNING SPRING CLUTCH

Challiss I. Clausing, Westmont, N.J., and Anthony P. Romano, Philadelphia, Pa., assignors to I-T-E Circuit Breaker Company, Philadelphia, Pa., a corporation of Pennsylvania Application April 29, 1957, Serial No. 655,688

3 Claims. (Cl. 192—41)

Our invention relates to a clutch for engaging a driving and a driven member for rotation of the driving member in a first direction and disengaging the driving and driven members responsive to rotation of the driving member in an opposite direction wherein a spring having concentric windings is utilized.

As may be seen in copending application Serial No. 537,444, filed September 29, 1955, entitled Disengageable Spring Clutch to Challiss I. Clausing and Anthony P. Romano and assigned to the assignee of the instant application, now Patent No. 2,883,022, granted April 21, 1959, spring clutch devices for connecting and disconnecting a driving and driven member responsive to a rotation of the driving member in a first or second direction have been provided which utilize a wound helical spring. One end of the helical spring is fastened to the driving member while the other end of the spring fits in a diameter of the driven member. By rotating the driver in a direction which is the same as the direction of the spring winding, the spring would tend to tighten or decrease its inner diameter to thereby grip the driven member to couple the driving and driven members if the spring is on an outer diameter of the driven member. When, however, the driving member is rotated in an opposite direction and opposite to the direction of the spring winding, the spring diameter will increase whereby the coupling between the spring and the driven member slips and the driving and driven members are uncoupled.

In all applications of the helical spring clutch device, it has been found that the relationship between the spring diameter and the diameter of the member which is to be coupled to the spring during clutching operations must be at relatively critical values with respect to one another to achieve the desired clutching operation, since the clutch characteristics are radically altered when the spring diameter varies by a relatively small amount.

Another disadvantage of the above noted type of spring device is that the clutch must have an axial length which is at least equal to the axial length of the helical spring utilized. Thus the compactness of the clutch is limited by this value.

The principle of the instant invention is to utilize a spring coupling member which is in the form of a concentrically wound spring wherein each turn lies within the adjacent turn as in the commonly used clock main spring.

Thus one end of the spring is fastened to the driving or driven member and a relative rotation of the driving and driven member in a first direction will cause an unwinding of the spring, while relative rotation between the driving and driven members in a second direction will cause a winding of the spring.

This winding and unwinding effect of the concentrically wound spring member may then be utilized to effect the desired clutching and unclutching between the driving and driven members because of the change in the spring diameter.

By way of example, this novel spring clutch could be so constructed that the spring is positioned internally of an annular shaped area of the driving member with its outer turn attached thereto. The driven member may then be positioned within the internal diameter of the spring whereby rotation of the driving member in a first direction will cause the inner turn of the spring to frictionally engage the driving member in a direction to wind the spring whereby a rigid engagement is obtained between the two members. When, however, the driving member is rotated in an opposite direction, the spring will be unwound and the driving and driven members will be unclutched.

If desired, the spring could be of the so-called negator type wherein the spring will always tend to have the same diameter when in the unstressed condition. Thus the spring could normally engage the driven member when in its natural state and this engagement will be defeated only when the driving member is driven in a direction which will unwind the spring.

In either of the above cases, the dimensions of the shaft receiving the spring is not critical, and the clutch is of relatively small size.

Accordingly, a primary object of our invention is to provide a novel spring clutch for coupling a driving and driven member for rotation of the driving member in a first direction and uncoupling the driving and driven member for rotation of the driving member in a second direction.

Another object of our invention is to provide a novel spring clutch device utilizing a concentrically wound spring member.

A still further object of our invention is to provide a novel spring clutch device having a relatively short axial length.

Still another object of our invention is to provide a novel spring clutch wherein large tolerances for the diameters of the driving or driven members are permissible without affecting the clutch characteristics.

A still further object of our invention is to provide a novel overrunning spring clutch which utilizes the negator type spring for the clutching element.

These and other objects of our invention will become apparent from the following description when taken in connection with the drawings, in which.

Figure 1:
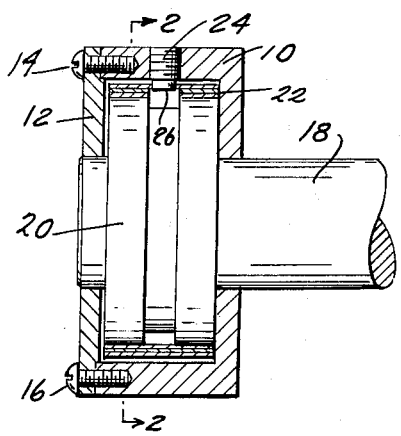
Figure 1 is a side partial cross-sectional view of our novel spring clutch when the driving member and driven members are coupled together.
Figure 2:
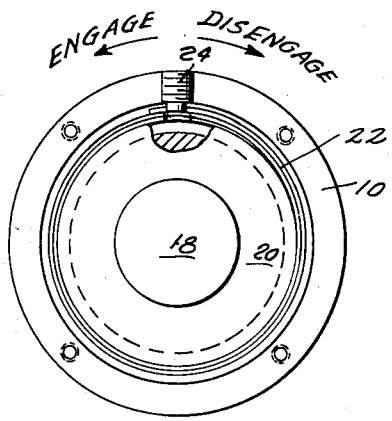
Figure 2 is a cross-sectional view of Figure 1 when taken across the lines 2—2.

Referring now to Figures 1 and 2, the driving member is seen as comprising the cup-shaped member 10 having a flat cover plate 12 connected thereto by fastening screws 14 and 16. The bottom of cup-shaped member 10 has a circular opening therein as does the center of cover 12 for accepting the shaft 18 which could be the driven member.

The shaft 18 has bushing 20 rigidly connected thereto in any desired manner so that the bushing 20 is positioned within the cup-shaped opening of member 10. Thus in assembling the device of Figures 1 and 2, it is clear that the cup-shaped member 10 is fitted over the shaft 18 and bushing 20 is inserted in the opening of cup-shaped member 10. The cover piece 12 is thereafter fastened into position to restrict axial movement of shaft 18 as well as to provide a dust-free enclosure.

The driving member and driven members of Figures 1 and 2 are rotatable with respect to one another when assembled in the manner shown and, if desired, bearing members (not shown) could be positioned between the adjacent surfaces of shaft 18 and cup-shaped member 10 and cover 12 so as to allow a relatively frictionless engagement therebetween for relative rotation between the driving and driven parts.

Cup-shaped member 10 is further seen as having our novel concentrically wound spring 22 positioned between the inner diameter of cup-shaped member 10 and the outer diameter of bushing 20. The outer convolution of spiral spring 22 is fastened to the cup-shaped member 10 of the driving member by the threaded insert 24 having a protruding portion 26 which is attached in any desired manner to the portion of the outer convolution.

Figure 3:
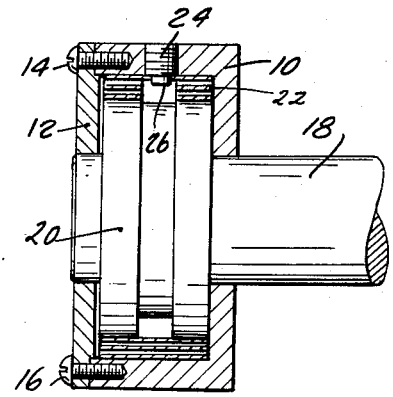
Figure 3 is similar to Figure 1 where the driving and driven members are uncoupled from one another.

The normal position of spring 22 of Figures 1, 2 and 3 is that shown in Figure 1 wherein each turn lies upon an adjacent turn. This type of spring is easily manufactured by appropriate forming and heat treatment whereby the spring will normally grip the outer diameter of bushing 20.

Thus when the driving member is rotated in the counterclockwise direction (see Figure 2), the spring will be wound in a direction which will tend to decrease its inner diameter and it will rigidly grip the bushing 20 whereby shaft 18, bushing 20, spring 22 and driving member 10 will be connected together and rotate as a single unit.

When, however, the driving member is rotated in a clockwise direction (see Figure 2), the spring 22 will be unwound as seen in Figure 3 and the inner convolutions of spring 22 will slip with respect to the outer diameter of bushing 20. Thus, the driving member 10 and the shaft 18 will be disconnected from one another for this clockwise rotation.

Figure 4:
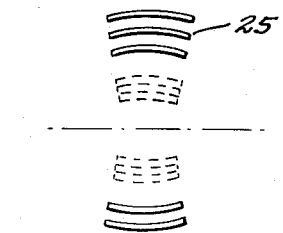
Figure 4 is a side cross-sectional view of an unwound negator type spring which could be utilized as the clutching member in the embodiment of Figures 1, 2 and 3.

While Figures 1, 2 and 3 show the clock type spring of our novel invention as having a flat cross section, it may be desirable to utilize a negator type spring wherein the strip has a cross curvature and the spring normally tends to coil to a set of preferred cylindrical dimensions. This type of spring is seen in Figure 4 as spring member 25 where the solid lines show the spring configuration when in the clutch disengaged position while the dotted lines show the preferred configuration of the spring.

Clearly, when a spring such as the negator spring 25 is used in the embodiment of Figures 1, 2 and 3, the convolutions will tend to assume the dotted position and each turn will be contracted on the next inner turn with the innermost turn gripping bushing 20. When the driving and driven members are rotated in a direction to wind the spring or to unwind the spring, clutching and unclutching respectively will result as was seen above for the case of Figures 1 and 3.

Although we have here described preferred embodiments of our invention, many modifications and variations will now be obvious to those skilled in the art and we prefer therefore to be limited, not by the specific disclosure herein, but only by the appended claims.

We claim:
1. A spring clutch; said spring clutch comprising a driving member and a driven member coaxially positioned with respect to one another; a concentrically wound spring having its innermost convolution frictionally engageable with one of said members and its outer convolution connected to the other of said members; rotation of said driving member in a first direction causing said spring diameter to vary to cause frictional engagement between said inner-convolution of said spring and said member engageable therewith; rotation of said driving member in a direction opposite said first direction causing said spring diameter to vary to cause slipping between said inner-convolution of said spring and said member engageable therewith; said concentrically wound spring when not under tension having a cross-curvature to impart a preferred coiling dimension thereto.

2. A spring clutch; said spring clutch comprising a driving member and a driven member coaxially positioned with respect to one another; a concentrically wound spring having its innermost convolution frictionally engageable with said driven member and its outer convolution connected to said driving member; rotation of said driving member in a first direction causing said spring diameter to vary to cause frictional engagement between said inner-convolution of said spring and said driven member; rotation of said driving member in a direction opposite said first direction causing said spring diameter to vary to cause slipping between said inner-convolution of said spring and said driving member; said concentrically wound spring when not under tension having a cross-curvature to impart a preferred coiling dimension thereto; said driven member comprising a shaft coaxially rotatable with respect to said driving member.

3. A spring clutch; said spring clutch comprising a driving member and a driven member coaxially positioned with respect to one another; a concentrically wound spring having its innermost convolution frictionally engageable with said driven member and its outer convolution connected to said driving member; rotation of said driving member in a first direction causing said spring diameter to vary to cause frictional engagement between said inner-convolution of said spring and said driven member; rotation of said driving member in a direction opposite said first direction causing said spring diameter to vary to cause slipping between said inner-convolution of said spring and said driven member; said driven member comprising a shaft rotatable with respect to said driving member and having an enlarged bushing coaxially fastened thereto; said driving member being terminated in a cup-shaped member; said cup-shaped member being constructed to receive said bushing of said driven shaft; said concentrically wound spring having its innermost convolution frictionally engageable with at least a portion of the external diameter of said bushing; a portion of the outermost convolution of said concentrically wound spring being connectable to an internal diameter of said cup-shaped member terminating said driving member; said concentrically wound spring having a cross-curvature to impart a preferred coiling dimension thereto; said cross-curvature being present when said spring is relaxed.

References Cited in the file of this patent
UNITED STATES PATENTS

| 1,964,310 | Bethenod | June 26, 1934 |
| 2,518,453 | Dodwell | Aug. 15, 1950 |

FOREIGN PATENTS

| 896,279 | Germany | Nov. 9, 1953 |